United States Patent [19]

Zambelli

[11] Patent Number: 4,708,606

[45] Date of Patent: Nov. 24, 1987

[54] VALVE, PARTICULARLY FOR AIR COMPRESSOR

[75] Inventor: Paolo Zambelli, Casalecchio di Reno, Italy

[73] Assignee: Fini Elettrocostruzioni Meccaniche, S.p.A., Zola Predosa, Italy

[21] Appl. No.: 39,975

[22] Filed: Apr. 20, 1987

[30] Foreign Application Priority Data

Apr. 28, 1986 [IT] Italy .................................. 3401 A/86

[51] Int. Cl.$^4$ ...................... F04B 21/00; F16K 21/04
[52] U.S. Cl. .................................. 417/559; 137/512.4; 137/852
[58] Field of Search ............... 137/512.15, 512.4, 851, 137/852; 417/559, 569, 570

[56] References Cited

U.S. PATENT DOCUMENTS

| | | | |
|---|---|---|---|
| 3,109,451 | 11/1963 | Mihalakis | 137/851 |
| 3,185,388 | 5/1965 | Siman et al. | 137/512.15 |
| 3,360,169 | 12/1967 | Susuki | 137/512.4 |
| 4,039,002 | 8/1977 | Broyan | 137/852 |
| 4,257,457 | 3/1981 | Futakawa et al. | 137/851 |

FOREIGN PATENT DOCUMENTS

| | | | |
|---|---|---|---|
| 2205786 | 8/1973 | Fed. Rep. of Germany | 417/559 |
| 2215983 | 10/1973 | Fed. Rep. of Germany | 417/569 |
| 3526225 | 3/1986 | Fed. Rep. of Germany | 417/559 |
| 47807 | 7/1978 | Japan | 417/571 |
| 47206 | 6/1982 | Japan | 137/852 |
| 47903 | 3/1979 | U.S.S.R. | 417/559 |

*Primary Examiner*—William L. Freeh
*Attorney, Agent, or Firm*—Omri M. Behr

[57] ABSTRACT

An improved type of valve in particular for air compressors is described. The main characteristic of the present invention lies in the fact that it includes a strip in which are formed two substantially U-shape slots passing therethrough, facing towards one another, which define a central portion, two intermediate portions constituted by a respective tongue fixed to a closure plate of a cylinder, and a perimetral portion. In the plate, in correspondence with the central portion and the perimetral portion, there are formed orifices for passage of a fluid, which orifices are alternatively closed or opened by the said central portion and perimetral portion.

10 Claims, 5 Drawing Figures

VALVE, PARTICULARLY FOR AIR COMPRESSOR

BACKGROUND OF THE INVENTION

An improved type of valve in particular for air compressors is The present invention relates to a valve of improved type, in particular for air compressors, but usable in any pumping device. This valve can conveniently be utilised both as a delivery valve and as a suction valve.

As is known, valves of the type indicated above are carried by a suitable closure plate of a cylinder within which reciprocates a piston. These valves allow the passage of a fluid through the holes formed in the plate, into or out from the cylinder according as the valve itself is a delivery or suction valve. The valves currently commercially available comprise a strip fixed centrally or at one end to the plate. These valves work on the principle of flexure of the strip which, in dependence on the stroke of the piston, alternately opens and closes the holes for the passage of fluid.

Valves currently commercially available have two serious disadvantages in that the use of these causes a loud noise and high temperatures. The noise is due to the fact that the strips vibrate because of the height to which they are caused to lift and which involves them in continuously striking on the plate and on an appropriate end stop for limiting the lifting movement. In some cases the phenomenon of resonance can also occur. In order to overcome this disadvantage some manufacturers do not install an end stop for the lifting movement, but notwithstanding this the strip whilst no longer striking at the end of its lifting movement, continues to strike upon closure. The high temperature is caused by the high friction which takes place during the passage of the fluid which takes place in turbulent flow because of the flow holes. To overcome this disadvantage some manufacturers form a plurality of flow holes in such a way as to increase the flow cross-section and also instal several valves. To carry more valves the plate must have a greater diameter and therefore it is necessary to increase the bore, and consequently to have the same capacity it is necessary at the same time to reduce the stroke. This has no effect other than to increase the overall manufacturing costs both because of the greater amount of working on the plate and because of the greater number of components utilised. In all cases the valves currently available are, for the reasons stated above, subjected to a considerable wear and therefore have a short life. This involves an increase in the costs because it is necessary very often to stop the operating the cycle of the devices in which these valves are installed to replace them.

SUMMARY OF THE INVENTION

The object of the present invention is that of providing a valve of improved type, in particular for air compressors, which will be free from the stated disadvantages.

According to the present invention there is provided a valve of improved type, in particular for air compressors, characterised by the fact that it comprises a strip in which are formed two first substantially U-shape slots passing therethrough, which face towards one another and define a central portion situated between the said first slots, two intermediate portions situated to the sides of the said central portion and constituted by a respective tongue fixed to a valve-carrier closure plate of a cylinder within which moves a piston, and a perimetral portion, at least the said perimetral portion being able to translate alternately by the action of the said piston, between a position closing orifices formed in the said plate and an open position in which fluid flow through the said orifices takes place.

BRIEF DESCRIPTION OF THE DRAWINGS

For a better understanding of the present invention a preferred embodiment is now described by way of non-limitative example, with reference to the attached drawings, in which.

DETAILED DESCRIPTION OF THE INVENTION

Figure 5:
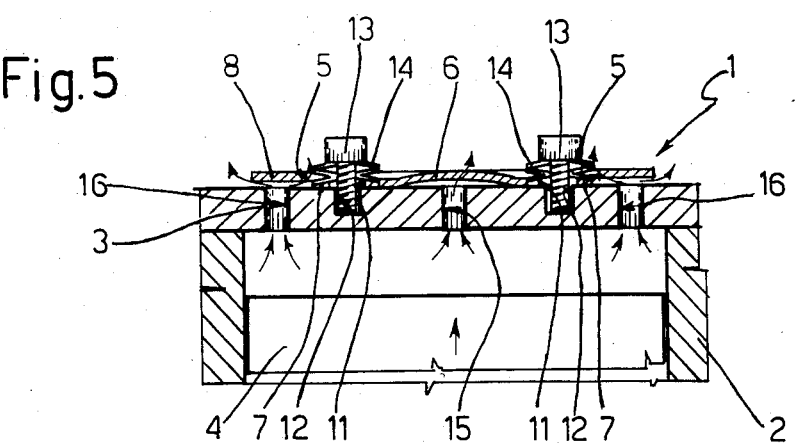
FIGS. 4 and 5 are partial sectioned views of the valve of FIG. 1 in two different operating stages.

As illustrated in the attached drawings, a valve generally indicated with the reference numeral 1 is installed in an air compressor of which there is schematically shown a cylinder 2 closed by a valve-carrier plate 3 and within which a piston 4 translates reciprocatingly. The valve 1 illustrated here is a delivery valve, but this does not constitute a limitation to the present invention in that the valve 1 can be used also as a suction valve.

Figure 1:
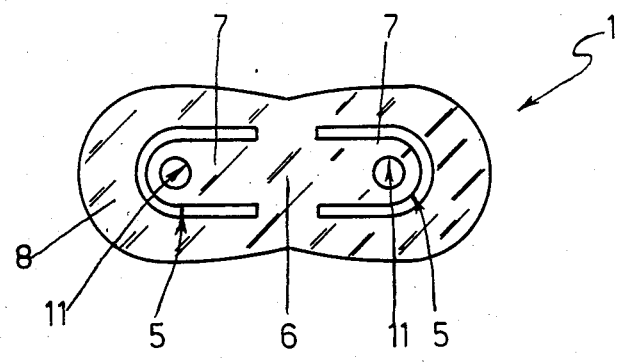
FIG. 1 is a plan view of a valve formed according to the principles of the present invention.
Figure 2:
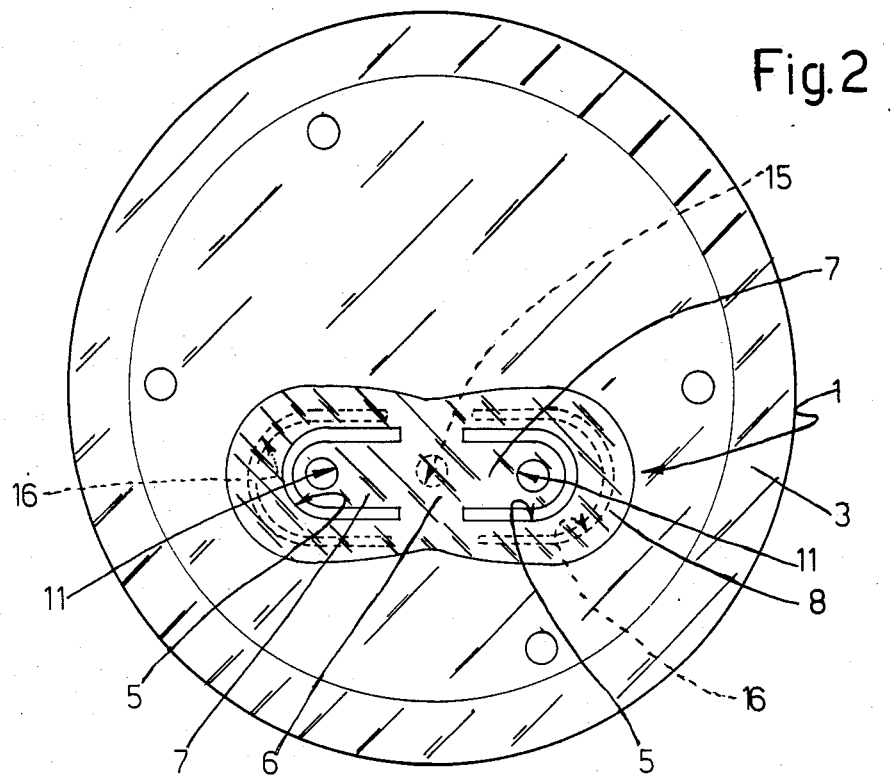
FIG. 2 is a plan view of a plate which carries the valve of FIG. 1.
Figure 3:
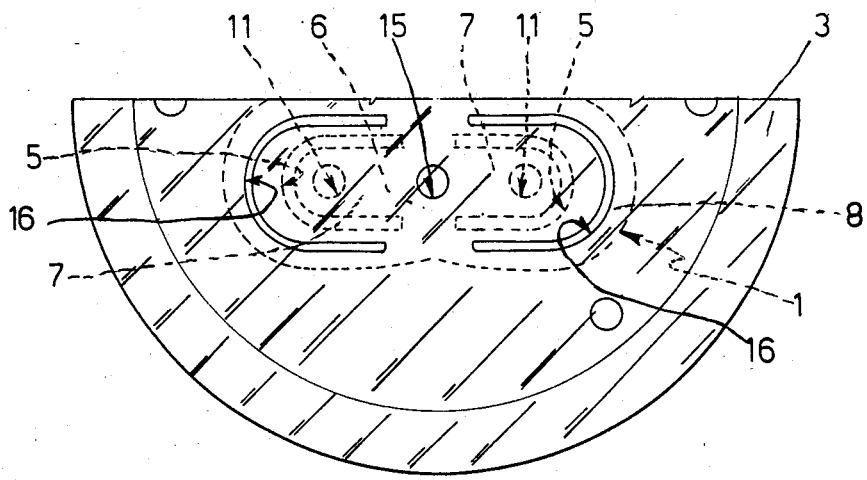
FIG. 3 is a partial view from below looking upwards of the plate of FIG. 2.

With reference to FIG. 1, the valve 1 is constituted by a strip, preferably of metal, in which are formed two U-shape through-slots 5 facing towards one another. The provision of the slots 5 defines in the strip a central portion 6 situated between the two slots 5, two intermediate portions situated to the sides of the central portion 6 and constituted by a respective tongue 7, and a perimetral portion 8. In particular, the tongues 7 are connected together by the central portion 6 and have at their free ends a respective through-hole 11. It is to be noted that the strip is symmetrical with respect to two orthogonal axes one of which is the longitudinal axis of the tongues 7.

As illustrated in Figures from 2 to 5, the valve 1 is mounted on the outer face of the plate 3. In particular, in this latter are formed two threaded blind holes 12 in which is screwed an associated screw 13 after having traversed one of the corresponding holes 11 of the strip. Between the head of the screw 13 and the edge of the corresponding hole 11 is installed a spring 14. In the plate 3 is formed a through-hole 15 which is situated in correspondence with the central portion 6, and two through-slots 16 of U-shape facing towards one another, situated in correspondence with the perimetral portion 8 of the valve 1. In particular, the slots 16 have the same axes of symmetry as the slots 5, which is also the longitudinal axis of the tongues 7. The hole 15 and the slots 16 constitute fluid flow orifices from the interior to the exterior of the cylinder 2. This fluid enters into the cylinder 2 through a suction valve, not illustrated, also carried by the plate 3. This suction valve can be shaped like the valve 1.

The operation of the valve 1 is as follows.

Figure 4:
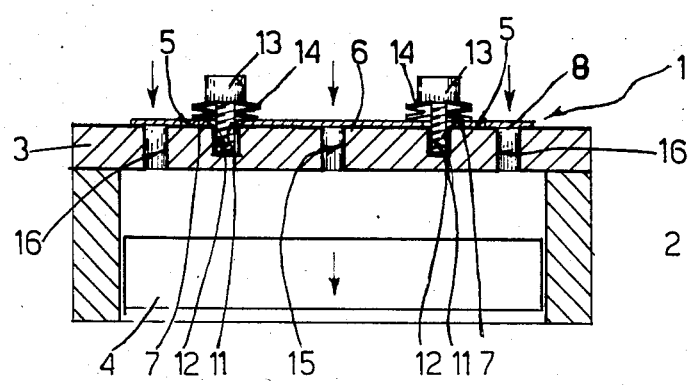

In particular, during the suction stroke illustrated in FIG. 4, the valve 1 closes the hole 15 and the slots 16 so that fluid flows in this hole from the exterior to the interior of the cylinder 2 through the said suction valve. During the compression stroke illustrated in FIG. 5 the fluid under pressure deforms the valve 1 causing opening of the hole 15 and the slots 16 and consequent passage of fluid through these latter. As indicated in FIG. 5 by corresponding arrows, the fluid from the hole 15 and the slots 16 passes round the edge of the perimetral portion 8 and upwardly through the slots 5. It is to be noted that because of the shape of the valve 1 and the manner in which it is fixed to the plate 3 the central portion 6 and the perimetral portion 8 lift substantially parallel to the plate 3. Only the tongues 7 deform to allow the central portion 6 to lift in that they are anchored to the plate 3 by the screws 13. The springs 14 constitute respective friction elements in that they allow the return movement of the valve 1 and its deformation to be softened.

From what has been described above the advantages achieved by the embodiment of the present invention are evident.

In particular, the use of the valve 1 allows a wide flow cross-section (holes 15 and slots 16) to be provided. The wide flow cross-section allows the stream to assume a more laminar flow and therefore reduces friction with the consequent reduction of temperature. Moreover, because of what has been just described, the stroke of the valve 1 can be reduced and therefore the noise can be reduced also because the springs 14 contribute to this. With respect to the currently utilised solutions, the solution described in this Patent allows the overall production costs to be reduced in that the working of the plate 3 is simple and in that the number of components utilised is reduced. Finally, it is to be noted that wear to which the valve 1 is subject is considerably reduced with a consequent increase in the life thereof and consequent reduction in maintenance and replacement costs.

Finally, it is clear that the valve 1 described and illustrated here can have modifications and variations introduced thereto without by this departing from the protective scope of the present invention.

In particular, the plate 3 could be provided with more holes 15 and/or could have more concentric slots 16. Moreover, in place of the U-shape slots 16 in the plate 3 there could be formed at least two contiguous slots which together would have a U-shape conformation. The valve 1 could, finally, be constituted by a strip of composite material such as, for example, carbon fibre.

I claim:

1. A valve of improved type, in particular for air compressors, wherein it comprises a strip in which are formed two first substantially U-shape slots (5) facing one another, which define a central portion (6) situated between the said first slots (5), two intermediate portions situated to the sides of the said central portion (6) and constituted by a respective tongue (7) fixed to a valve carrier plate (3) closing a cylinder (2) within which translates a piston (4), and a perimetral portion (8); at least the said perimetral portion (8) being able to translate alternately by the action of the said piston (4) between a closure position closing orifices (15 and 16) formed in the said plate (3) and an open position in which fluid flow takes place through the said orifices (15 and 16)

2. A valve according to claim 1, wherein said strip is symmetrical with respect to two orthogonal axes one of which is the longitudinal axis of the said tongue (7).

3. A valve according to claim 1, said central portion and said perimetral portion are supported by the outer face of the said plate (3) and therefore able to allow the delivery of fluid.

4. A valve according to claim 1, wherein the said strip is metal.

5. A valve according to claim 1, wherein said strip is made of a composite material such as, for example, carbon fibre.

6. A valve according to claim 1 wherein, the said tongues (7) are fixed to the said plate (3) at their free ends.

7. A valve according to claim 6, wherein said tongues (7) have at their ends a respective first through-hole (11) traversed by a respective screw (13) which engages a second threaded hole (12) formed in the said plate (3); between the head of the said screw (13) and the edge of the said first hole (11) there being installed spring means (14).

8. A valve according to claim 1, wherein said orifices include at least a third through-hole (15) formed in the said plate (3) in correspondence with the said central portion (6) of the said strip and at least two second through-slots (16) formed in correspondence with the said perimetral portion (8).

9. A valve according to claim 8, wherein said second slots (16) are U-shape and face towards one another; the said second slots (16) having the same axis of symmetry as the said first slots (5).

10. A compressor of the type comprising a cylinder (2) within which reciprocatingly translates a piston (4), closed by a valve carrier plate (3), an improved valve comprising a strip in which are formed two first substantially U-shape slots (5) facing one another, which define a central portion (6) situated between the said first slots (5), two intermediate portions situated to the sides of the said central portion (6) and constituted by a respective tongue (7) fixed to said valve carrier plate (3) closing said cylinder (2) within which translates said piston (4), and a perimetral portion (8); at least the said perimetral portion (8) being able to translate alternately by the action of the said piston (4) between a closure position closure position closing orifices (15 and 16) formed in the said carrier plate (3) and an open position in which fluid flow takes place through the said orifices (15 and 16).

* * * * *